(12) United States Patent
Tauchi et al.

(10) Patent No.: US 6,205,179 B1
(45) Date of Patent: *Mar. 20, 2001

(54) PICTURE REPRODUCING APPARATUS AND PICTURE REPRODUCING METHOD

(75) Inventors: Yoichiro Tauchi, Saitama; Kenji Komori, Chiba, both of (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/991,940

(22) Filed: Dec. 16, 1997

(30) Foreign Application Priority Data

Dec. 24, 1996 (JP) ................................... 8-344242

(51) Int. Cl.[7] ...................................... H04B 1/66
(52) U.S. Cl. ................. 375/240.16; 375/240.24
(58) Field of Search ..................... 348/403, 395, 348/407, 415, 414, 423, 416, 390; 386/4, 52, 27, 33, 109, 111, 34, 123, 120; 375/240, 121, 240.16, 240.24; 315/121

(56) References Cited

U.S. PATENT DOCUMENTS

| | | | |
|---|---|---|---|
| 5,091,782 | * 2/1992 | Krause et al. | 348/400 |
| 5,142,362 | * 8/1992 | Masera et al. | 348/415 |
| 5,454,011 | * 9/1995 | Shimoyoshi | 375/240 |
| 5,546,461 | * 8/1996 | Ibaraki et al. | 348/390 |
| 5,638,124 | * 6/1997 | Soda et al. | 348/402 |
| 5,732,155 | * 3/1998 | Saito | 348/416 |
| 5,790,747 | * 8/1998 | Kanota et al. | 386/123 |

* cited by examiner

*Primary Examiner*—Chris S. Kelley
*Assistant Examiner*—Gims Philippe
(74) *Attorney, Agent, or Firm*—Frommer, Lawrence & Haug, LLP.; William S. Frommer; Bruno Polito

(57) ABSTRACT

A picture reproducing device in which a still picture can be recorded/reproduced to high picture quality without requiring a dedicated still picture processor or a RAM configured for storing picture data for processing by the dedicated still picture processor. In reproducing video signals from a recording medium having quantized and recorded DCT coefficient data for every DCT block made up of a pre-set number of blocks two-dimensionally arrayed as a continuous picture of video signals, the playback signals from the recording medium are dequantized by a dequantizer to generate DCT coefficient data from which playback picture data are generated by the inverse DCT processor, while motion detection is effected for every DCT block based on the DCT coefficient data. The resulting motion detection information is replaced by the LSB of the playback picture data of the corresponding DCT block by the deblocking-deshuffling processor.

4 Claims, 9 Drawing Sheets

SOURCE CONTROL

| | | | | | | | | |
|---|---|---|---|---|---|---|---|---|
| PC 0 | 0 | 1 | 1 | 0 | 0 | 0 | 0 | 1 |
| PC 1 | CGMS | | ISR | | GMP | | SS | |
| PC 2 | REC ST | 1 | REC MODF | | 1 | | DISP | |
| PC 3 | FF | FS | FC | IL | ST | SC | BCSYS | |
| PC 4 | 1 | GENRE CATEGORY | | | | | | |

FIG.2

→ HORIZONTAL

↓ VERTICAL

| C00 | | | | | | | |
|-----|--|--|--|--|--|--|--|
| C10 | | | | | | | |
| C20 | | | | | | | |
| C30 | | | | | | | |
| C40 | | | | | | | |
| C50 | | | | | | | |
| C60 | | | | | | | |
| C70 | C71 | C72 | C73 | C74 | C75 | C76 | C77 |

FIG.5

EXAMPLE OF EXPANDING 525/60 MOTION PICTURE MB

EXAMPLE OF EXPANDING 625/50 MOTION PICTURE MB

PICTURE REPRODUCING APPARATUS AND PICTURE REPRODUCING METHOD

BACKGROUND OF THE INVENTION

1. Field of the Invention

This invention relates to a picture reproducing method and apparatus for reproducing a still picture recorded on a recording medium.

2. Description of related Art

In a conventional digital video tape recorder for digital recording/reproducing of video data, one frame of picture signals from an imager or other picture input signals is stored on a random access memory (RAM), in which the one-frame picture data are split into 8 by 8 pixel blocks and shuffled with a pre-set number of blocks as a unit. The resulting data is orthogonal-transformed, such as by discrete cosine transform (DCT), and quantized for compressing the one-frame video data. The compressed video data is framed and deshuffled, that is processed with an operation reversed from shuffling, on the RAM, for restoration to the original data array. An outer parity and an inner parity for error correction are then appended to the resulting data and encoded for recording. The encoded data is then recorded on a video tape.

In the playback system, the playback signals from the video tape are decoded, that is processed with an operation reversed from the encoding, to produce playback data, which is then error-corrected on the RAM using the outer parity and the inner parity, and shuffled. The resulting shuffled data is deframed and dequantized and the resulting dequantized data is inverse-orthogonal-transformed for expanding the one-frame playback data. The expanded one-frame playback data are deshuffled, that is processed with an operation reversed from the shuffling, and deblocked, for reproducing the video data having the original pixel array.

Meanwhile, the picture signals of the standard television system, such as the National Television System Committee (NTSC) system of the Phase Alternation by Line (PAL) system, are interlaced signals. Therefore, if, in the above-described conventional digital video tape recorder, the input picture signals are stored as still pictures in a RAM for shuffling or deshuffling, and the still pictures are directly recorded/reproduced as contiguous frame pictures, the picture portions having a significant amount of motion represent field period deflection on reproduction.

If one of the even-numbered frame and the odd-numbered frame making up an original one frame picture×2 is recorded as one frame for possibly evading the above-mentioned field period deflection, vertical resolution is deteriorated.

If the recording system has a dedicated still picture processor configured for storing one-frame video data in a RAM and the amount of motion within one frame is found so that a picture portion with a small amount of motion is directly outputted as a frame and the picture portion with a significant amount of motion is outputted as repetition of one of the fields, still pictures free of field period deflection can be recorded for reproducing still pictures of high definition by any reproducing device. However, since the dedicated still picture processor and a RAM for storing the video data for processing by this still picture processor need to be provided in the recording system, the circuit scale of the recording system is prohibitively increased.

SUMMARY OF THE INVENTION

It is therefore an object of the present invention to provide a picture reproducing method and apparatus for recording/reproducing pictures of high picture quality without the necessity of providing a dedicated still picture processor or a RAM for storing the video data for processing by this still picture processor.

In one aspect, the present invention provides a picture reproducing device for reproducing video signals from a recording medium having orthogonal-transformed coefficient data quantized and recorded thereon, the orthogonal-transformed coefficient data being data orthogonal-transformed on the basis of a transform block having a pre-set number of pixels as a unit, with the pixels being two-dimensionally arrayed as a continuous picture of a frame of video signals. The picture reproducing device includes dequantizing processing means for dequantizing playback signals from a recording medium for generating the orthogonal-transformed coefficient data, and inverse orthogonal transform processing means for inverse orthogonal transforming the orthogonal-transformed coefficient data generated by the dequantizing processing means and for effecting motion detection on the basis of the orthogonal-transformed coefficient data from one transform block to another. The picture reproducing device also includes multiplexing means for replacing the information specifying the results of motion detection for every transform block by the inverse orthogonal transform processing means, memory means for storing one frame of playback video data having multiplexed thereon the information specifying the result of motion detection outputted by the memory means and control means for controlling readout of video data from the memory means so that the playback video data of the transform block detected to be a still picture block is outputted as a frame and so that the playback video data of the transform block detected to be a moving picture block is outputted as a field twice.

Preferably, the multiplexing means replaces the LSB of blue data of a macro-block including a transform block detected to be a moving picture block based on the information specifying the result of motion detection by the information specifying the result of motion detection.

Preferably, the control means generates the control information controlling video data readout from the memory means on the macro-block basis, based on the information specifying the results of motion detection read out from the memory means, the control means controlling readout of the video data from the memory means on the macro-block basis.

In another aspect, the present invention provides a picture reproducing method for producing video signals from a recording medium having orthogonal-transformed coefficient data quantized and recorded thereon, the orthogonal-transformed coefficient data being data orthogonal-transformed on the basis of a transform block having a pre-set number of pixels as a unit, with the pixels being two-dimensionally arrayed as a continuous picture of a frame of video signals. The method includes inverse-orthogonal-transforming orthogonal-transform coefficient data obtained on dequantizng playback signals from the recording medium, effecting motion detection from one transform block to another based on the orthogonal-transform coefficient data, multiplexing the information specifying the results of motion detection on the LSB of the playback picture data for transmitting the information along with the playback picture data and outputting, based on the results of motion detection specified by the LSB of the playback video data, playback picture data of a transform block detected to be a still picture block and playback picture data of a transform block detected to be a moving picture block as a frame and as twice outputted fields, respectively.

With the picture reproducing device of the present invention, in reproducing video signals from a recording medium having quantized and recorded orthogonal transform coefficient data for every orthogonal transform block made up of a pre-set number of blocks two-dimensionally arrayed as a continuous picture of video signals, the playback signals from the recording medium are dequantized by a dequantizer to generate orthogonal transform coefficient data from which playback picture data are generated by the inverse orthogonal transform processor, while motion detection is effected every orthogonal transform block based on the orthogonal transform coefficient data. The resulting motion detection information for every transform block, that is the information specifying whether a given picture is a moving picture or a still picture, is replaced by the LSB of the playback picture data of the corresponding orthogonal transform block by the multiplexing means, and the playback video data, multiplexed with the information specifying the result of motion detection, is stored by one frame in memory means. This enables the information specifying whether a given picture is a moving picture or a still picture to be transmitted to the readout side of memory means without increasing the number of bits for the information specifying whether a given picture is a moving picture or a still picture or increasing the capacity of the memory means due to address expansion without complicating the control.

With the picture reproducing device according to the present invention, picture data readout from the memory means is controlled by the control means for outputting the playback video data of a transform block found to be a still picture block as a frame and for outputting the playback video data of a transform block found to be a moving picture block as a twice outputted field, thus enabling reproduction of a high quality still picture without requiring a dedicated still picture processor.

Also, with the picture reproducing device according to the present invention, since the control means generates the control information controlling video data read out from the memory means on the macro-block basis, based on the information specifying the results of motion detection read out from the memory means, and controls video data readout from the memory means on the macro-block basis, picture quality deterioration due to motion detection errors can be prevented from occurring to reproduce high-quality still pictures.

Moreover, with the present picture reproducing method for producing video signals from a recording medium having orthogonal-transformed coefficient data quantized and recorded thereon, the orthogonal-transformed coefficient data being data orthogonal-transformed on the basis of a transform block having a pre-set number of pixels as a unit, with the pixels being two-dimensionally arrayed as a continuous picture of a frame of video signals, orthogonal-transformed coefficient data obtained on dequantizing playback signals from a recording medium are inverse-orthogonal-transformed to generate playback video data, motion detection is effected every transform block based on the orthogonal transform coefficient data, the information specifying the result of motion detection is multiplexed to the LSB of the playback video data to transmit the information along with the playback video data and, based on the result of motion detection specified by the LSB of the playback video data, the video data of the transform block detected to be a still picture block as a frame, while the playback picture data of the transform block detected to be a moving picture block is outputted as a twice outputted field, thus enabling the high-quality still picture to be reproduced without requiring a dedicated still picture processor.

BRIEF DESCRIPTION OF THE DRAWINGS

FIG. 2 shows the structure of appended data VAUX making up an ECC block along with video data recorded and/or reproduced by the picture recording/reproducing apparatus.

FIG. 5 illustrates an example of DCT coefficients used for motion detection by a motion detection unit in the DCT/IDCT processor.

DESCRIPTION OF PREFERRED EMBODIMENTS

Figure 1:
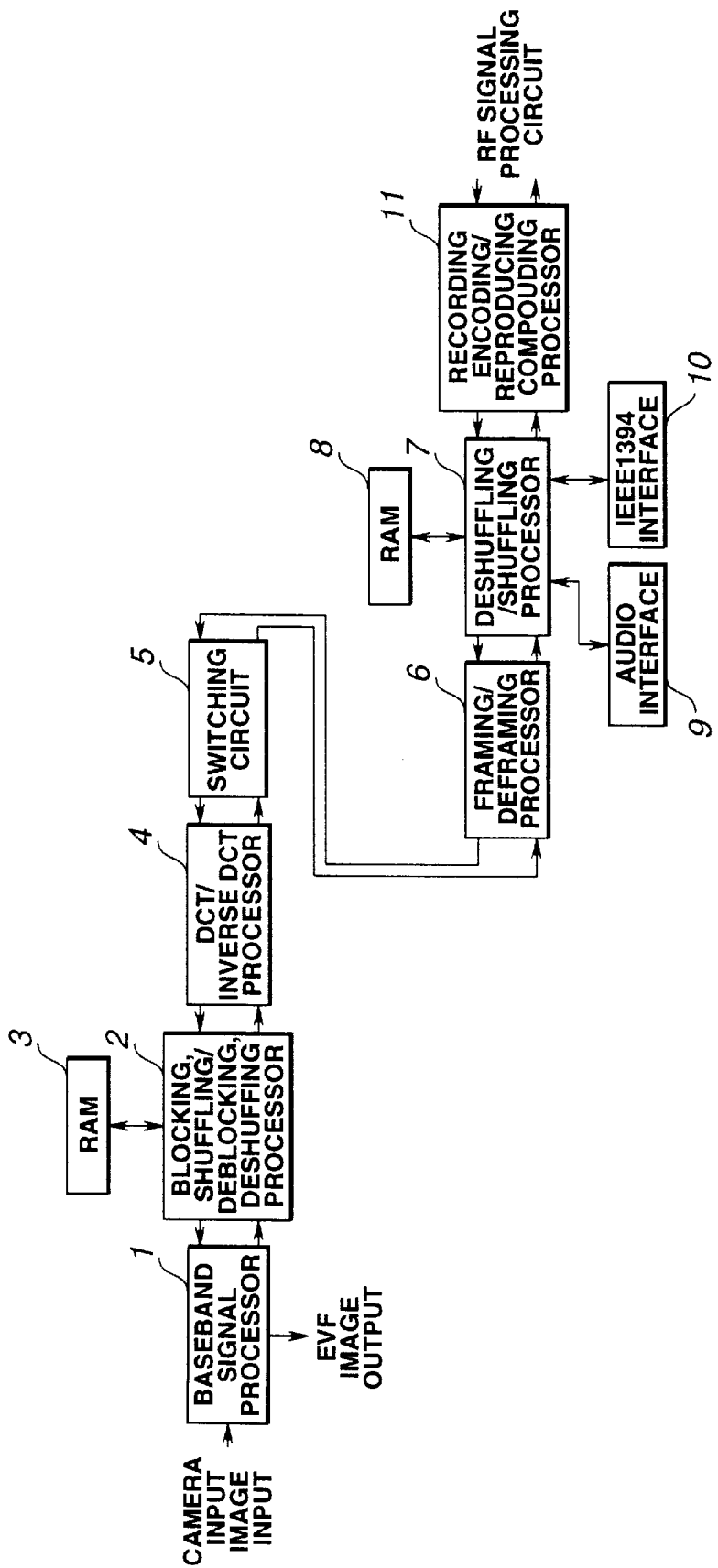
FIG. 1 is a block diagram showing the structure of a picture recording/reproducing apparatus according to the present invention.

Referring to the drawings, preferred embodiments of the present invention will be explained in detail.

FIG. 1 shows the structure of a picture recording/reproducing apparatus embodying the invention. The picture recording/reproducing apparatus shown in FIG. 1 is directed to a DVCR enabling synchronous/asynchronous communication by IEEE (The International of Electrical and Electronics Engineers, Inc.) 1394 high-performance serial bus. Specifically, the picture recording/reproducing apparatus includes a blocking-shuffling/deblocking-deshuffling processor 2, connected to a baseband signal processor 1, and a random access memory (RAM) 3 and a DCT/IDCT processor 4, both connected to the blocking shuffling/deblocking deshuffling processor 2. The picture recording/reproducing apparatus also includes a quantizer/dequantizer 5 connected to the DCT/IDCT processor 4, and a framing/deframing processor 6 connected to the quantizer/dequantizer 5. The picture recording/reproducing apparatus also includes a shuffling/deshuffling processor 7 and a random access memory (RAM) 8 connected to the shuffling/deshuffling processor 7. The picture recording/reproducing apparatus further includes an audio interface 9, an IEEE1394 interface 10 and a recording encoding/reproducing decoding processor 11.

The structure and the operation of the recording system in the present picture recording/reproducing apparatus is explained.

In the present picture recording/reproducing apparatus, picture signals from an imager or other picture input signals are sent during recording via baseband signal processor 1 to the blocking shuffling/deblocking deshuffling processor 2, so that one-frame picture input signals for recording are stored in the RAM 3. If, during the still picture recording mode, the one-frame picture input signals, that is video data of a still picture, are stored in the RAM 3, the contiguous pictures of the frame of the still picture is transferred to the next stage.

The blocking shuffling/deblocking deshuffling processor 2 splits the one-frame video data on the RAM into 8-by-8 pixel blocks and shuffles the data in terms of a pre-set number of blocks as a unit to send the shuffled video data to the DCT/IDCT processor 4.

The DCT/IDCT processor 4 discrete cosine transforms the video data supplied from the blocking shuffling/ deblocking deshuffling processor 2 to convert the video data into two-dimensional DCT coefficient data on the time axis, in terms of the 8-by-8 pixels as a unit, to send the resulting data to the quantizer/dequantizer 5.

The DCT/IDCT processor 4 in the present embodiment detects the motion for the moving picture recording mode, as conventionally, and handles video data by the 8×8 DCT mode for a block exhibiting only small field-to-field difference, while handling video data by the 2×4×8 DCT mode for a block exhibiting a larger field-to-field difference.

The quantizer/dequantizer 5 quantizes the video data, converted by the DCT/IDCT processor 4 into the two-dimensional DCT coefficients data on the time axis, for generating compressed video data.

The framing/deframing processor 6 frames video data supplied from the quantizer/dequantizer 5 to send the framed video data to the shuffling/deshuffling processor 7.

The shuffling/deshuffling processor 7 stores video data supplied from the framing/deframing processor 6 in the RAM 8 to process the video data on the RAM 8 with deshuffling which is the reverse operation of shuffling by the blocking shuffling/deblocking deshuffling processor 2. The shuffling/deshuffling processor 7 appends not only the auxiliary data (VAUX: video auxiliary data) but also an outer parity to the video data restored to the original array by the above-described deshuffling to send the resulting data to the recording encoding/reproducing decoding processor 11. The outer parity is appended in terms of the error check and correction (ECC) block as a unit. Moreover, the shuffling/ deshuffling processor 7 appends the outer parity to the audio data entered via audio interface 9, in terms of the ECC block as a unit, to send the resulting data to the recording encoding/reproducing decoding processor 11.

The recording encoding/reproducing decoding processor 11 also appends the inner parity for error check and correction (ECC) to the ECC block based video data or audio data, supplied from the shuffling/deshuffling processor 7, and encodes the resulting data in a manner suited for recording for generating recording signals for recording the recording signals via a recording/reproducing unit, not shown, on a video tape.

The video recording/reproducing apparatus records, along with the video data, system data of a pack structure comprised of pack data (PC0) and pack data (PC1 to C4), as auxiliary data VAUX making up an ECC block along with the video data, as shown in FIG. 2. The auxiliary data VAUX, the pack header PC0 of which is '0110001', is a SOURCE_CONTROL pack, and gives an FF(frame/field) flag, a FS (First/Second) flag, a FC (Frame change) flag, an II (Interlace) flag, a ST (Still-field picture) flag and a SC (Still camera picture) flag by its pack data (PC3). The above FF flag indicates whether only one field is outputted twice during one frame period (FF=0) or both fields are outputted during one frame period (FF=1). The FS flag indicates whether the first field is outputted (FF=1) or the second field is outputted (FS=1). The FC flag indicates whether the current frame is the same as (FC=0) or differs from (FC=1) the directly previous frame. The IL flag indicates whether data of two fields of a frame are interlaced (IL=1) or not (IL=0). The ST flag indicates whether the time distance between two fields in a frame is approximately zero sec (ST=0) or corresponds to the field period in the 525-60 system or the 625-50 system (ST=1). In addition, the SC flag indicates whether the image is taken by a still camera (SC=1) or otherwise (SC=1).

In the present embodiment, the ST flag indicates the time distance between two fields in a frame of approximately zero, that is a still picture, by ST=0, while indicating a moving picture having a time distance corresponding to the field period in the 525-60 system or the 625-50 system by ST=1. In the still picture recording mode, the ST flag of the SOURCE_CONTROL pack of the auxiliary data VAUX of the still picture data portion is set to 1 for recording.

In the present picture recording/reproducing device, picture data of a still image are stored in the RAM 8 of the shuffling/deshuffling processor 7 and, with the write/readout direction of the blocking shuffling/deblocking deshuffling processor 2 reversed, the picture data of the RAM3 is outputted to the baseband signal processor 1 to permit the recorded still image to be monitored on an electronic view finder or an image output.

The structure and the operation of the reproducing system of the present picture recording/reproducing apparatus is now explained.

With the present picture recording/reproducing apparatus, playback signals reproduced from a video tape via a recording/reproducing unit, not shown, is sent to the recording encoding/reproducing decoding processor 11.

The recording encoding/reproducing decoding processor 11 processes the playback signal with decoding, as a counterpart operation of encoding during recording, for generating playback data. The recording encoding/reproducing decoding processor 11 also processes the playback data with error correction and decoding by the inner parity to supply the error-corrected playback data to the shuffling/deshuffling processor 7.

The shuffling/deshuffling processor 7 stores the playback data supplied from the recording encoding/reproducing decoding processor 11 in the RAM 8 on which the processor 7 processes the ECC block based playback data with error correction by an outer parity. The playback audio data of the error-corrected playback data is outputted via audio interface 9. The shuffling/deshuffling processor 7 also processes the playback video data with shuffling similar to that performed during recording by the blocking shuffling/ deblocking deshuffling processor 2 to send the shuffled playback video data to the framing/deframing processor 6.

The framing/deframing processor 6 deframes the playback picture data supplied from the deshuffling/shuffling processor 7 to send the deframed data to the quantizer/ dequantizer 5. The playback picture data, obtained from the framing/deframing processor 6, correspond to picture data converted during recording by the DCT/IDCT processor 4 into time-domain two-dimensional DCT coefficient data and quantized by the quantizer/dequantizer 5.

The quantizer/dequantizer 5 dequantizes the playback picture data obtained by the framing/deframing processor 6 to reproduce the time-domain two-dimensional DCT coefficient data to send the reproduced data to the DCT/IDCT processor 4.

In the picture recording/reproducing apparatus of the present embodiment, the operating mode is switched, during reproduction, based on the ST flag of a SOURCE_CONTROL pack of auxiliary data VAUX of a data portion of the still picture, recorded as the auxiliary data VAUX constituting the ECC block along with the video data, so that the operating mode is switched to the still picture reproducing mode when the ST flag is "1". The two-dimensional DCT coefficient data from the framing/deframing processor 6 is sent to the DCT/IDCT processor 4.

Figure 3:
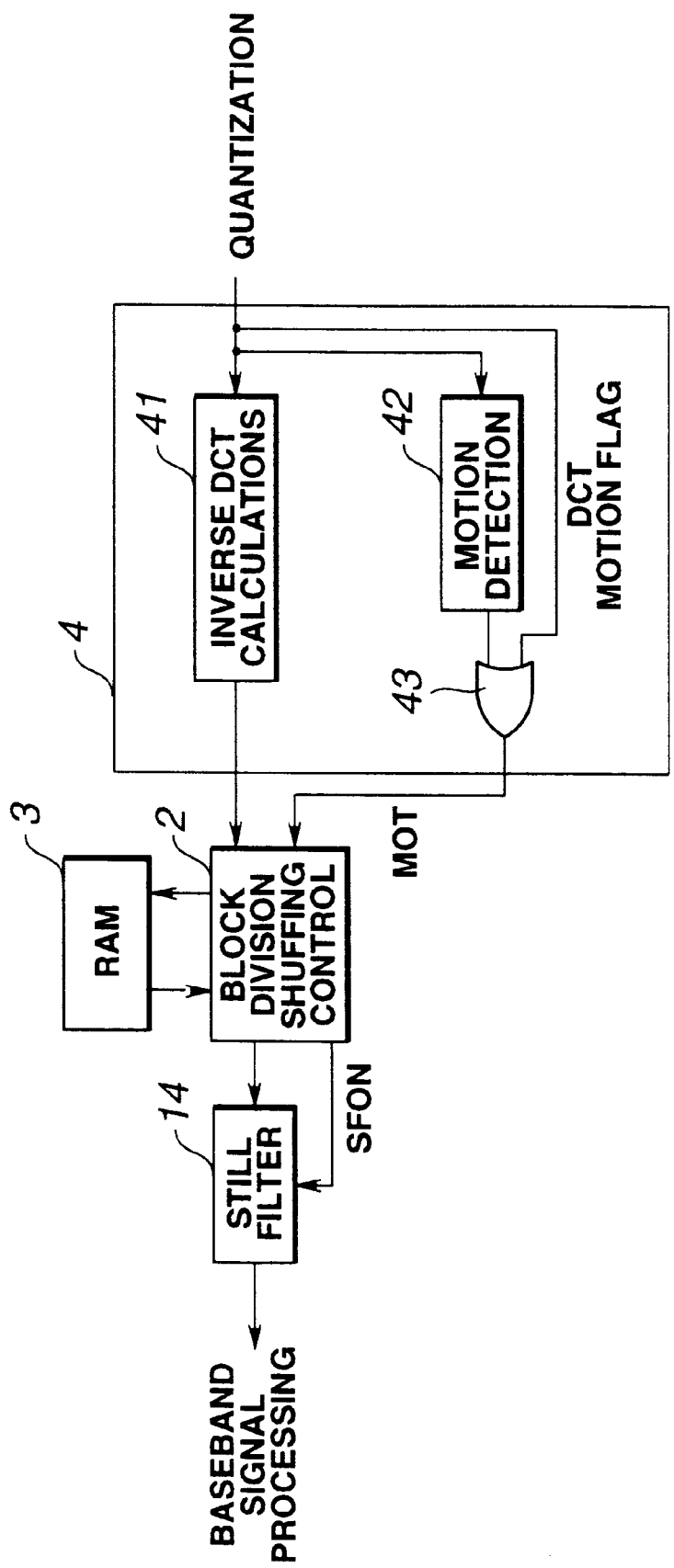
FIG. 3 is a block diagram showing the structure of a reproducing side of a DCT/IDCT processor in the above picture recording/reproducing apparatus.

Referring to FIG. 3, the DCT/IDCT processor 4 includes an inverse DCT processor 41, a motion detector 42 and an OR gate 43 and processes the 8×8 time-domain two-dimensional DCT coefficient data by the inverse DCT processor 41 by inverse DCT to output resulting video data. The DCT/IDCT processor 4 also performs, by the motion detector 42, the so-called motion detection of detecting whether the DCT block is a moving picture block or a still picture block, based on the above-mentioned two-dimensional DCT coefficient data, for outputting a motion detection flag MOT via OR gate 43.

Figure 4:
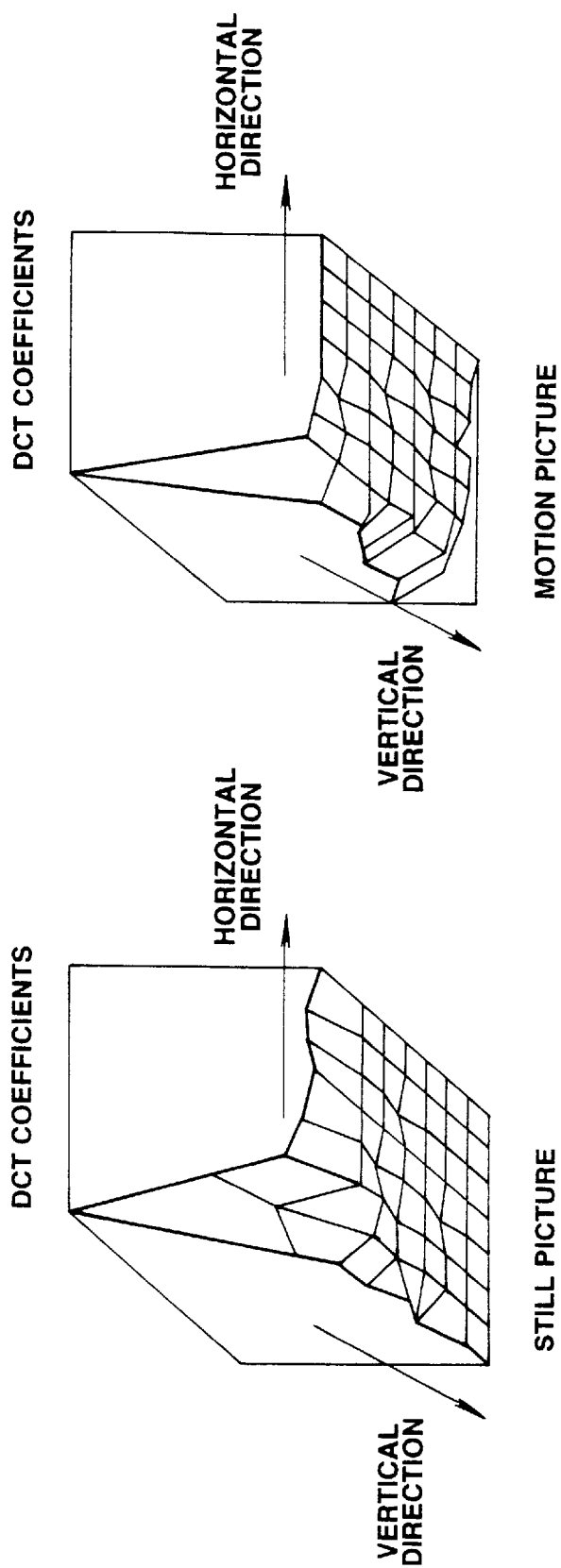
FIGS. 4A and 4B illustrate an example of the state of distribution of DCT coefficients for still and moving pictures.

As may be seen from FIGS. 4A and 4B showing the state of distribution of the DCT coefficients for a still picture and that for a moving picture, the moving picture has a significant field-to-field difference, so that the high-range coefficients of the moving picture in the vertical direction tend to be increased as compared to those in the horizontal direction. The motion detector 42 exploits this tendency to effect motion detection by comparing the sum total of the coefficients and the peak values as found from the distribution of the coefficients to the pre-set threshold values.

For example, the motion detection in case the DCT coefficients are C00 to C77 as shown in FIG. 5 is effected by the equation:

$$\text{Motion} = \left(\sum_{i=0}^{7} |C_{7i}| > A\right) \wedge$$
$$((\max|C_{7x}| - \min|C_{7x}|) > B \wedge (|C_{10}| < (|C_{50}| + |C_{60}| + |C_{70}|))$$

That is, a picture is judged to be a moving picture when the following three conditions:
(1) That the sum total of absolute values of coefficients from C70 to C77 be not less than a threshold value A;
(2) that the maximum difference of the coefficients from C70 to C77 be not less than a threshold value B; and
(3) that the sum of absolute values of C50, C60 and C70 be larger than the absolute value of C10; are met simultaneously.

Figure 6:
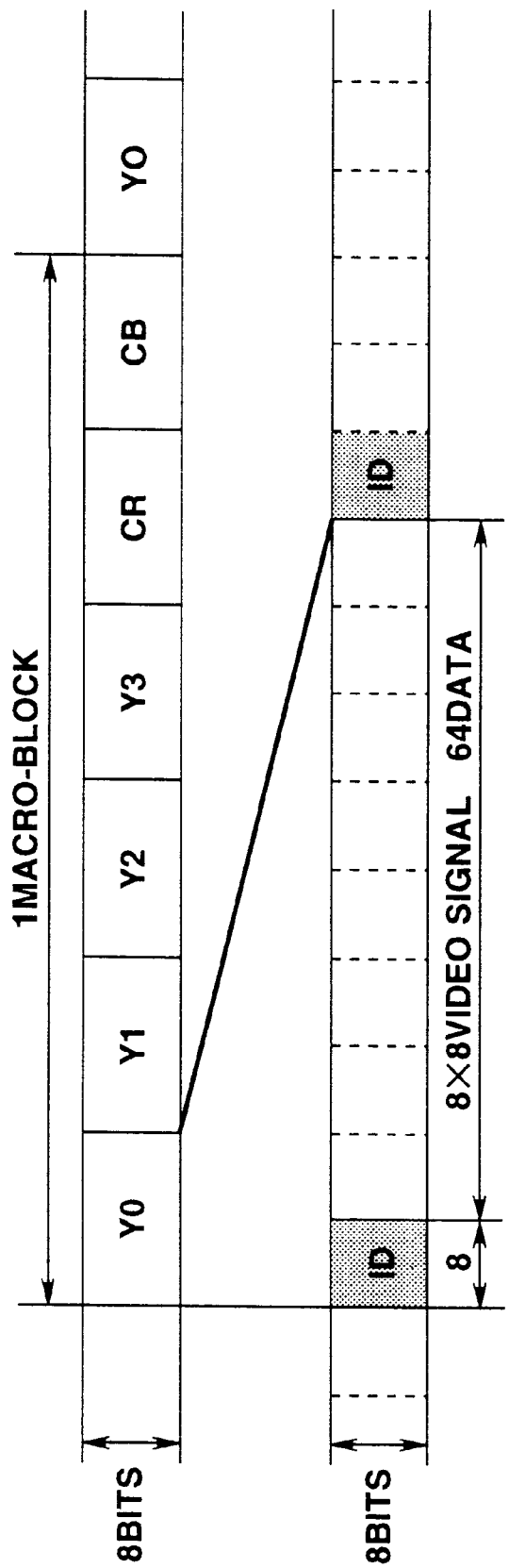
FIG. 6 illustrates a macro-block and an ID area of video data reproduced by the picture recording/reproducing apparatus.

The video data, obtained on inverse DCTing the time-domain two-dimensional DCT coefficient data by the DCT/IDCT processor 4, constitute a macro-block by 4 DCT blocks of luminance data Y0, Y1, Y2 and Y3 and each 1 DCT block of red data CR and blue data CB, as shown in FIG. 6. A motion detection flag MOT, specifying whether each DCT block is a moving picture block or a still picture block, is inserted in an ID area between video data, with the resulting data being fed to the blocking shuffling/deblocking deshuffling processor 2.

The blocking shuffling/deblocking deshuffling processor 2 stores one-frame video data of the video data supplied from the DCT/IDCT processor 4 in the RAM 8 on which to process the vide data with deshuffling processing which is a reverse operation of the shuffling performed by the shuffling/deshuffling processor 7. This shuffling/deshuffling processor 7 controls the outputting of the video data, restored to the original array by the above-described deshuffling, so that the video data of the still picture blocks is directly outputted as the existing frame via baseband signal processor 1, while the video data of the moving picture block is outputted as the same field×2 via baseband signal processor 1.

Figure 7:
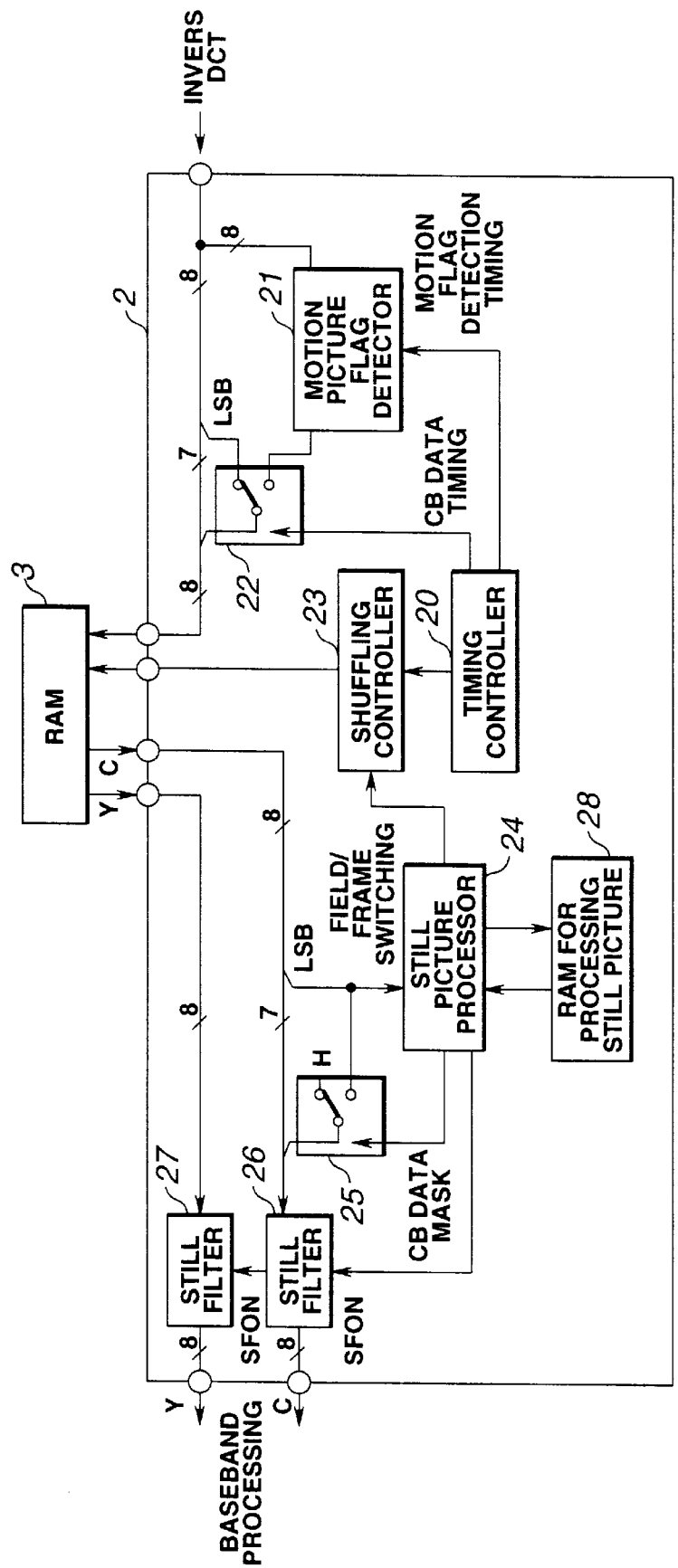
FIG. 7 is a block diagram showing the structure of a reproducing side of a blocking-shuffling/deblocking-deshuffling processor in the picture recording/reproducing apparatus.

Referring to FIG. 7, showing a detailed structure of the blocking shuffling/deblocking deshuffling processor 2, the processor 2 includes a moving picture flag detector 21, a first switching circuit 22, a shuffling controller 23 and a still picture processing controller 24. The blocking shuffling/deblocking deshuffling processor 2 also includes a second switching circuit 25, controlled by the still picture processing controller 24, a first still filter 26, a second still filter 27 and a still picture processing RAM 28 connected to the still picture processing controller 24.

The moving picture flag detector 21 detects the motion detection flag MOT from the ID area between video data supplied from the DCT/IDCT processor 4, responsive to a moving picture detection timing signal accorded by the timing controller 20, for detecting the moving picture block. This moving picture detector 21 takes the logical sum of the motion detection flags MOT of the luminance data Y0 to Y4, red data CR and blue data CB making up a macro-block, for generating a new macro-block-based motion detection flag MMOT which states that the DCT blocks of a macro-block, in any DCT block of which has been detected the motion detection flag MOT, are all moving blocks, for sending the MMOT signals to the first switching circuit 22.

The first switching circuit 22 is responsive to a switching timing signal accorded by the timing controller 20 to switch between the LSB of the blue data and the MMOT signal at a timing of the blue data. In this manner, the information specifying whether the macro-block is a moving picture or a still picture can be multiplexed on the blue data and written in the RAM for shuffling/deshuffling 3 so that the information specifying whether the macro-block is a moving picture or a still picture can be transmitted to the readout side of the RAM 3 without increasing the number of bits for the information specifying whether a given macro-block is a moving picture or a still picture, or enlarging the addresses thus imposing the necessity for increasing the RAM capacity, or complicating the control.

The reason the information specifying whether the picture is a moving picture or a still picture, that is the above-mentioned MMOT signal, for the LSB of the blue data CB, is that the gradation of the blue data visually has the least effect on the picture.

The still picture processing controller 24 detects the LSB of the blue data read out from the RAM 3 to find an area of the macro-block in which to effect moving picture processing for writing the information in the picture processing RAM 28. A number of bits corresponding to the number of bits of a macro-block for one frame suffices for the picture processing RAM 28.

Figure 8A:
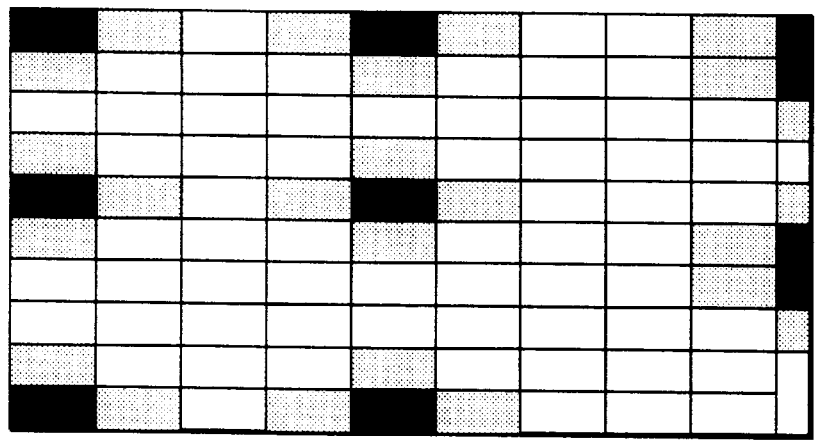
FIGS. 8A and 8B illustrate two examples of expanded micro-blocks.
Figure 8B:
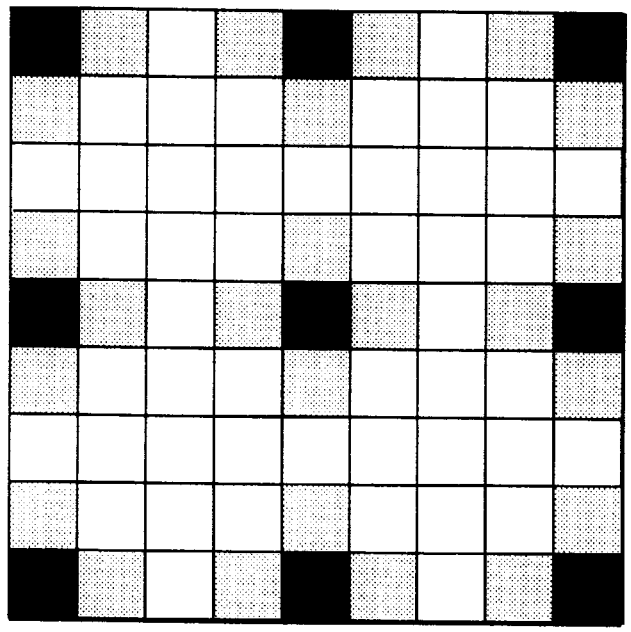

In the present embodiment, the still picture processing controller 24 performs a processing of deeming macro-blocks lying above, below and on both sides of a macro-block containing a moving picture block, shown netted in FIGS. 8A and 8B, shall all be moving blocks, or equivalent processing.

In this manner, the information specifying which block(s) of one frame of still video signals should be outputted as the frame or as the same field×2, is formulated on the picture processing RAM 28. The LSB of the blue data CB, outputted at this time, is fixed at a pre-set value (herein logic "H") by the second switching circuit 25 operating responsive to a CB data mask signal accorded by the timing controller 20.

Figure 9:
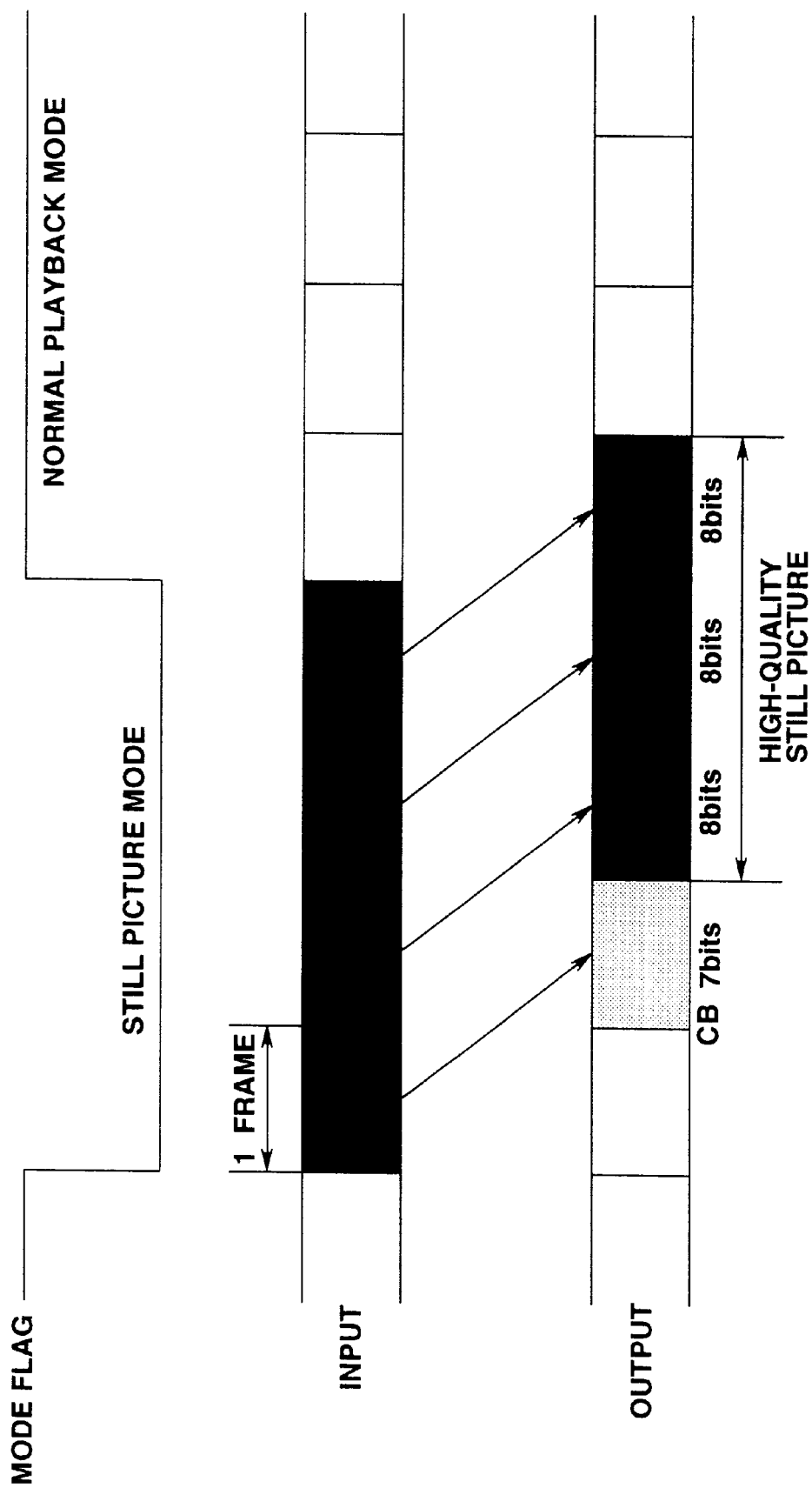
FIG. 9 illustrate outputting states of a still picture reproduced by the picture recording/reproducing apparatus.

Referring to FIG. 9, the shuffling controller 23 sequentially performs control, from the next frame, as to whether the video data should be read from the RAM 3 on the frame basis or on the field basis, in accordance with the data on the still picture processing RAM 28, and outputs vide data of the still video block directly as the frame, via the baseband signal processor 1, while outputting video data of the moving picture block as the same field×2 via the baseband signal processor 1.

When outputting the video data of the moving picture block portion with the same field×2, the above first and still filter 14 can be actuated by a control signal SFON from the still picture processing controller 24 for further improving the picture quality.

Thus, with the present embodiment of the picture recording/reproducing apparatus, one-frame video data can be stored in the RAM for effecting motion detection in a frame, such that a still picture block can be directly outputted as the frame, while a moving picture block can be outputted as the same fields×2, thus enabling high-quality still picture to be recorded/reproduced without requiring a dedicated still picture processor.

What is claimed is:

1. A picture reproducing apparatus for reproducing video signals from a record medium having orthogonal-transformed coefficient data quantized and recorded thereon, said orthogonal-transformed coefficient data being generated by partitioning a video signal into a plurality of signal blocks wherein each said signal block includes a predetermined number of pixels and orthogonally transforming each said signal block to generate a plurality of transform blocks, said apparatus comprising:

dequantizing means for dequantizing signals reproduced from said recording medium to generate said orthogonal-transformed coefficient data;

inverse orthogonal transforming means for inverse orthogonal transforming said orthogonal-transformed coefficient data generated by said dequantizing means to generate a plurality of decoded blocks, and for effecting motion detection on each said transform block;

multiplexing means for replacing for each decoded block a portion of the decoded block with information specifying the results of said motion detection for the corresponding transform block, thereby generating a plurality of multiplexed blocks;

memory means for storing said multiplexed blocks; and control means for controlling readout of said multiplexed blocks from said memory means on a block-by-block basis such that when the information specifying the results of the motion detection which is included in a block indicates that the block represents a still picture data corresponding to two different video fields of the block are read from said memory and are used to represent the block, and when the information specifying the results of the motion detection indicates that the block represents a moving picture data corresponding to one of two video fields of the block is read from said memory twice such that data of said one video field and duplicate data of said one video field are used to represent the block, the second of said two video fields not being read from said memory and not being used to represent the block.

2. The apparatus as set forth in claim 1, wherein a plurality of said multiplexed blocks form a macroblock and wherein said control means reads out data from said memory means on a macroblock-by-macroblock basis such that when the information specifying the results of the motion detection indicates that a macroblock represents a still picture the macroblock is read out as a frame's worth of data, and when the information specifying the results of the motion detection indicates that the macroblock represents a moving picture the macroblock is read out as a field's worth of data and the reading of the field's worth of data is repeated to generate a frame's worth of data.

3. A picture reproducing method for reproducing video signals from a record medium having orthogonal-transformed coefficient data quantized and recorded thereon, said orthogonal-transformed coefficient data being generated by partitioning a video signal into a plurality of signal blocks wherein each said signal block includes a predetermined number of pixels and orthogonally transforming each said signal block to generate a plurality of transform blocks, said method comprising the steps of:

dequantizing signals reproduced from said recording medium to generate said orthogonal-transformed coefficient data;

effecting motion detection on each said transform block;

performing an inverse orthogonal transform on said orthogonal-transformed coefficient data generated by said dequantizing to generate a plurality of decoded blocks;

replacing for each decoded block a portion of the decoded block with information specifying the results of said motion detection for the corresponding transform block, thereby generating a plurality of multiplexed blocks;

storing said multiplexed blocks in a memory; and controlling readout of said multiplexed blocks from said memory on a block-by-block basis such that when the information specifying the results of the motion detection which is included in a multiplexed block indicates that the block represents a still picture data corresponding to two different video fields of the block are read from said memory and are used to represent the block, and when the information specifying the results of the motion detection indicates that the block represents a moving picture data corresponding to one of two video fields of the block is read from said memory twice such that data of said one video field and duplicate data of said one video field are used to represent the block, the second of said two video fields not being read from said memory and not being used to represent the block.

4. A picture reproducing apparatus for reproducing video signals from a record medium having orthogonal-transformed coefficient data quantized and recorded thereon, said orthogonal-transformed coefficient data being generated by partitioning a video signal into a plurality of signal blocks wherein each said signal block includes a predetermined number of pixels and orthogonally transforming each said signal block to generate a plurality of transform blocks, said apparatus comprising:

dequantizing means for dequantizing signals reproduced from said recording medium to generate said orthogonal-transformed coefficient data;

inverse orthogonal transforming means for inverse orthogonal transforming said orthogonal-transformed coefficient data generated by said dequantizing means to generate a plurality of decoded blocks containing blue color data, and for effecting motion detection on each said transform block;

multiplexing means for replacing for each decoded block the least significant bit of blue color data included within the decoded block with the information specifying the result of the motion detection for the corresponding transform block, thereby generating a plurality of multiplexed blocks;

memory means for storing said multiplexed blocks; and control means for controlling readout of said multiplexed blocks from said memory means on a block-by-block basis such that when the information specifying the results of the motion detection which is included in a block indicates that the block represents a still picture data corresponding to two different video fields of the block are read from said memory and are used to represent the block, and when the information specifying the results of the motion detection indicates that the block represents a moving picture data corresponding to one of two video fields of the block is read from said memory twice such that data of said one video field and duplicate data of said one video field are used to represent the block, the second of said two video fields not being read from said memory and not being used to represent the block.

* * * * *